(12) United States Patent
Lee et al.

(10) Patent No.: US 7,274,824 B2
(45) Date of Patent: Sep. 25, 2007

(54) METHOD AND APPARATUS TO REDUCE THE SYSTEM LOAD OF MOTION ESTIMATION FOR DSP

(75) Inventors: Heng-Kuan Lee, Taipei Hsien (TW); Yu-Min Wang, Tai-Chung (TW); Ching-Jer Liang, Hsin-Chu Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 792 days.

(21) Appl. No.: 10/249,440

(22) Filed: Apr. 10, 2003

(65) Prior Publication Data
US 2004/0202373 A1    Oct. 14, 2004

(51) Int. Cl.
G06K 9/36      (2006.01)
G06K 9/46      (2006.01)

(52) U.S. Cl. ........................ 382/236; 382/238
(58) Field of Classification Search ................ 382/236
See application file for complete search history.

(56) References Cited

U.S. PATENT DOCUMENTS 5,696,836 A * 12/1997 Yoshino et al. ............. 382/107
5,719,642 A * 2/1998 Lee ............................ 348/699
6,104,836 A * 8/2000 Buckley et al. ............. 382/236
6,473,529 B1 * 10/2002 Lin ............................. 382/236
6,594,396 B1 * 7/2003 Yoshida et al. ............. 382/236
6,868,123 B2 * 3/2005 Bellas et al. ............ 375/240.16
6,990,149 B2 * 1/2006 Yoon et al. ............. 375/240.24

* cited by examiner

Primary Examiner—Wenpeng Chen
Assistant Examiner—Yuzhen Ge
(74) Attorney, Agent, or Firm—Winston Hsu

(57) ABSTRACT

A method and apparatus to reduce the system load of motion estimation for DSP discloses circular buffers, a plurality of absolute difference calculation circuits, a multiple input adder, a full adder, a plurality of accumulators, and a control circuit. The first four bytes from the reference block buffer and the first four bytes from the search window buffer are sent to the four absolute difference calculation circuits. The control circuit determines which of the accumulators requires incrementing the value already in that accumulator by the current output of the multiple input adder. A new set of bytes from the search window buffer is then sent to the absolute difference calculation circuits, a new sum is calculated, and a second accumulator is incremented by the new sum. When all accumulators have been updated, new reference block data used. Each byte of data is loaded from memory only once.

14 Claims, 5 Drawing Sheets

METHOD AND APPARATUS TO REDUCE THE SYSTEM LOAD OF MOTION ESTIMATION FOR DSP

BACKGROUND OF INVENTION

1. Field of the Invention

The present invention relates to power consumption during digital image processing in video compression. More specifically, a device and method that reduce power consumption by reducing the number of memory accesses when calculating absolute difference values for image correlation is disclosed.

2. Description of the Prior Art

Video compression standards have long been available to lower the required bandwidth and alternatively to increase the amount of video data that can be stored in any given sized storage media. In line with these goals, motion estimation is widely used for video compression standards such as MPEG-1, MPEG-2, and MPEG-4 among others.

The conventional methods for motion estimation are well known to those skilled in the art. In general, each frame goes through a process where a current video frame is read into memory. A small reference block is located within a larger search window of the current frame and a motion vector is generated estimating the direction of motion of the reference block within the search window. This motion vector is used in conjunction with information from the previous frame to generate an estimated image frame in respect to the current frame. The estimated image frame is then subtracted from the current frame, which effectively removes duplicated imagery and results in much less data necessary to be saved in the output file.

Because the estimated image frame is subtracted from the current frame and only the difference is saved, it is obvious that the more accurate the estimation is, the smaller the output file is. The accuracy of the estimated image frame to a large degree depends on the accuracy of the motion vector. The accuracy of the motion vector in turn depends on the accuracy of locating the reference block within the search window.

It is generally accepted that the reference block can be located within the search window most accurately using a full search. A full search consists of comparing the reference block sequentially with every possible location within the search window. For each location, the comparison is done by adding the absolute values of the difference between the brightness of each pixel in the reference block and the brightness of the corresponding pixel in the current search location. The location with the lowest total of absolute values is considered the best match and is selected to be used to calculate the motion vector.

Obviously, methods other than a full search that compare the reference block with a more limited number of search locations are frequently employed with satisfying results. However, nearly every method used today selects the best match based on the absolute differences in brightness between the pixels in the reference block and the pixels in the search locations. Therefore, the calculation and summing of the needed absolute differences is the common core of video image correlation.

Please refer to FIG. 1 that is an absolute difference accumulator circuit (ADAC) according to a prior art. The ADAC comprises a plurality of absolute difference calculation circuits, a multiple input adder, a full adder, and an accumulator. A full description of this particular ADAC can be found in U.S. Pat. No. 5,610,850 incorporated herein by reference. Basically, pixel values from the reference block are inputted to the X1-Xn inputs and pixel values from the current search location are inputted into the Y1-Yn inputs of the absolute difference calculation circuits. The results of the absolute difference calculation circuits are added by the multiple input adder and output to the full adder. The full adder sums the output from the multiple input adder and the current value in the accumulator and places the sum back into the accumulator. When all of the pixel values for one search location have been processed, the value in the accumulator represents the match value for that particular search location. This match value is then stored elsewhere in memory, the value in the accumulator is reset to zero, and the process repeats for each search location.

Nearly all image correlation methods used today select search locations that at least in part overlap one another. Because the match value for each search location is independently calculated, the pixel values in the overlapping portions of the search locations need to be loaded into memory multiple times. Each memory access uses power. Often motion estimation is used in devices, such as a PDA or cellular phone, which obtain power from a limited power source such as a battery. Power consumed by unneeded memory accesses prevents that same limited power from being used for other purposes and generates unnecessary heat within the device.

SUMMARY OF INVENTION

It is therefore a primary objective of the claimed invention to reduce power consumption and system load for digital signal processing by reducing the number of memory accesses when calculating absolute difference values in image correlation by calculating match values for multiple search locations simultaneously.

Briefly summarized, the preferred embodiment of the claimed invention discloses a circular reference block buffer, a circular search window buffer, a plurality of absolute difference calculation circuits, a multiple input adder, a full adder, a plurality of accumulators, and a control circuit. The degree of plurality of the absolute difference calculation circuits is normally equal to the degree of plurality of accumulators and equal to the number of match values being simultaneously calculated. The control circuit includes a storage unit having four pointers, or indices, to control accessing of data in the two circular buffers. The buffers are normally registers.

A preferred example of the present invention has the plurality of absolute difference calculation circuits and the plurality of accumulators equal to four. At least one word-sized chunk of pixel data is loaded from the search window in memory into the circular search window buffer and a word of pixel data from the reference block is loaded into the circular reference block buffer. The first four bytes of pixel data from the circular reference block buffer are sent to a first input of the four absolute difference calculation circuits respectively. The first four bytes of pixel data from the circular search window buffer are sent to a second input of the four absolute difference calculation circuits respectively. The results of the absolute difference calculations are summed by the multiple input adder and output to the full adder.

Because each accumulator represents a different search location, the control circuit determines which of the accumulators requires incrementing the value already in that accumulator by the current output of the multiple input adder. The value in the accumulator indicated by the control circuit is then sent to the full adder, added by the full adder to the output from the multiple input adder, and the result placed back into that accumulator. A new set of bytes from the circular search window buffer, offset from the previously sent set of bytes, is then sent to the second input of the absolute difference calculation circuits respectively, a new sum is calculated, and a second accumulator is incremented by the new sum. The cycle repeats using a new set of search window data and incrementing a corresponding accumulator until all accumulators have been updated. The next four bytes of data from the circular reference block buffer and the next set of bytes from the circular search window buffer are then sent to the absolute difference calculation circuits respectively. The process is repeated until the accumulators hold the total match values for their respective search locations. Data for the circular reference block buffer and the circular search window buffer are loaded from memory as needed.

It is an advantage of the claimed invention that pixel value data is loaded into memory only one time when calculating the match values for a plurality of search locations, reducing system load and power consumption.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
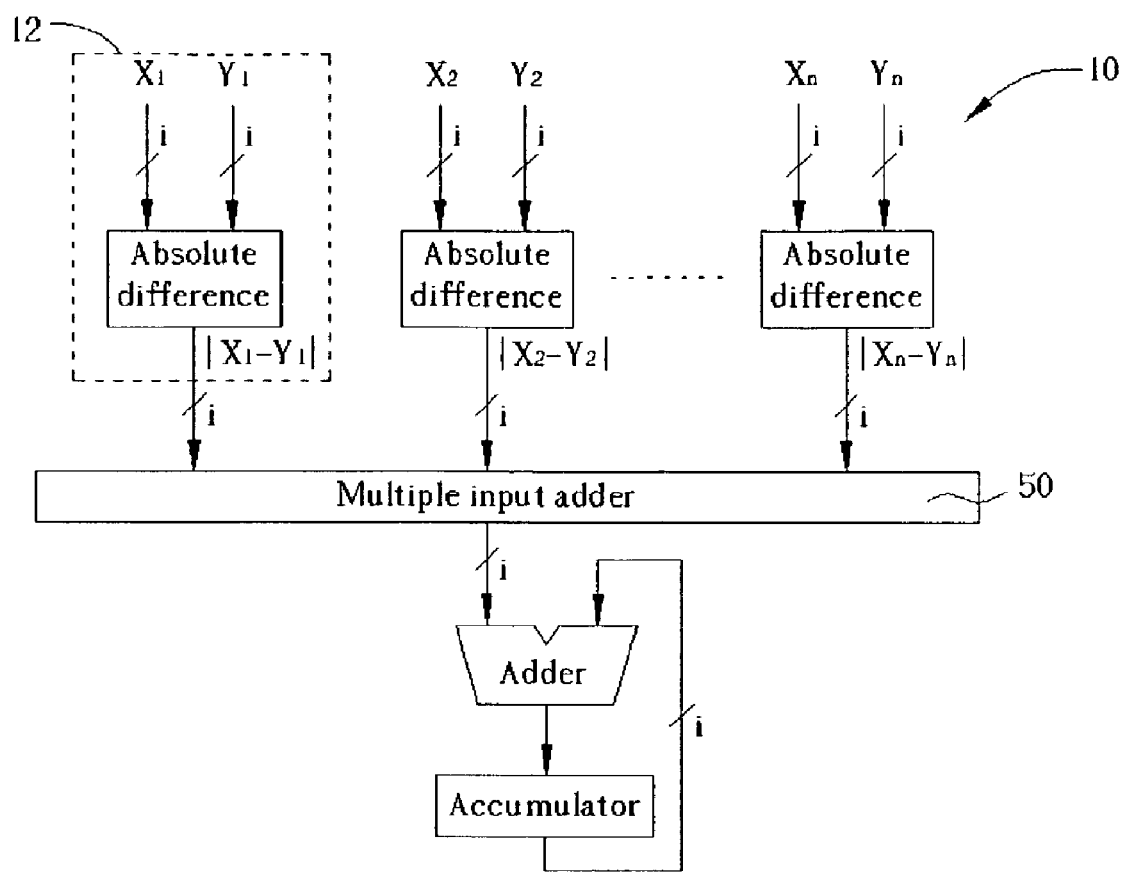
FIG. 1 is a block diagram of a circuit used for calculating match values according to the prior art.
Figure 2:
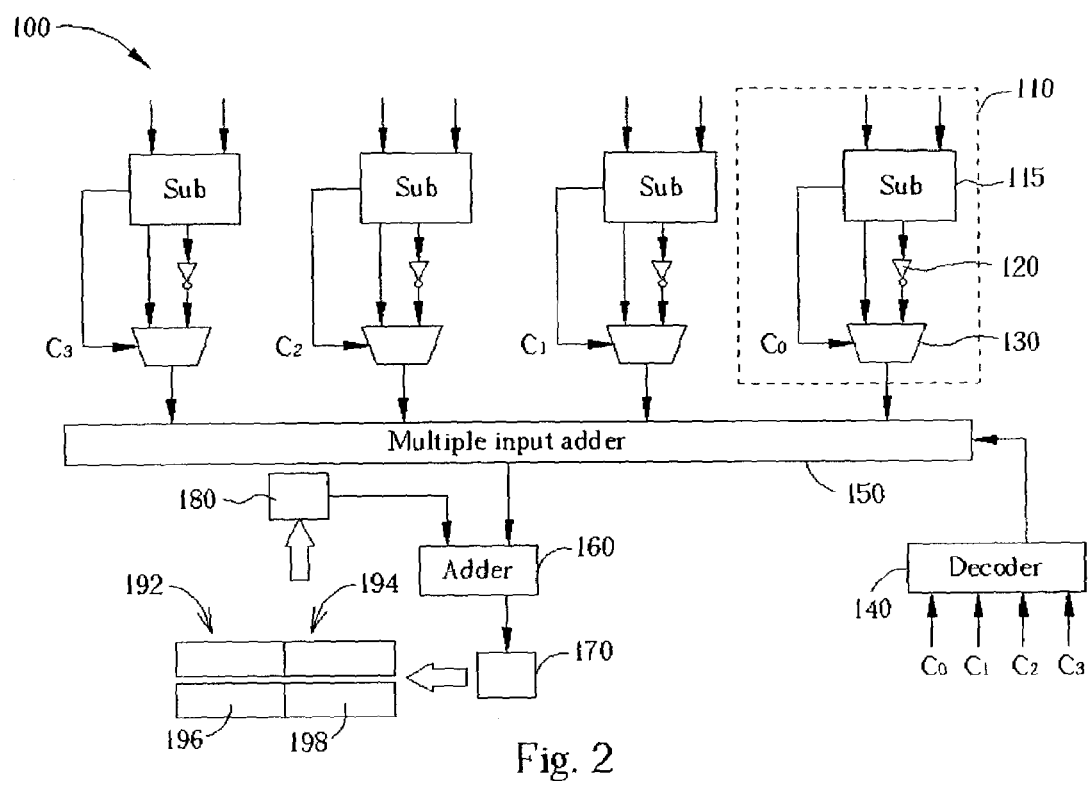
FIG. 2 is a block diagram of a circuit used for calculating match values according to the present invention.
Figure 3:
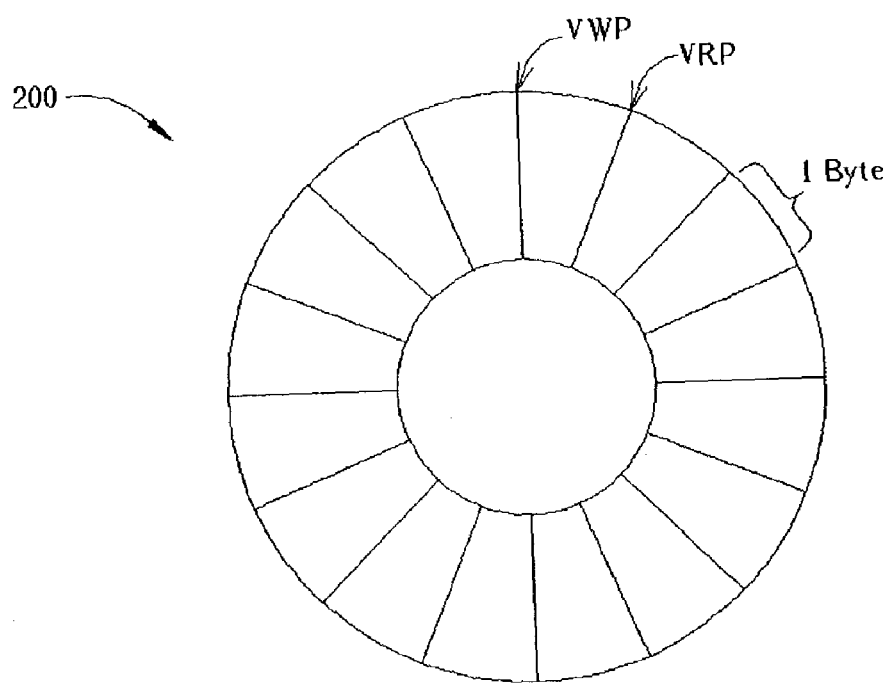
FIG. 3 illustrates a circular data buffer according to the present invention.
Figure 4:
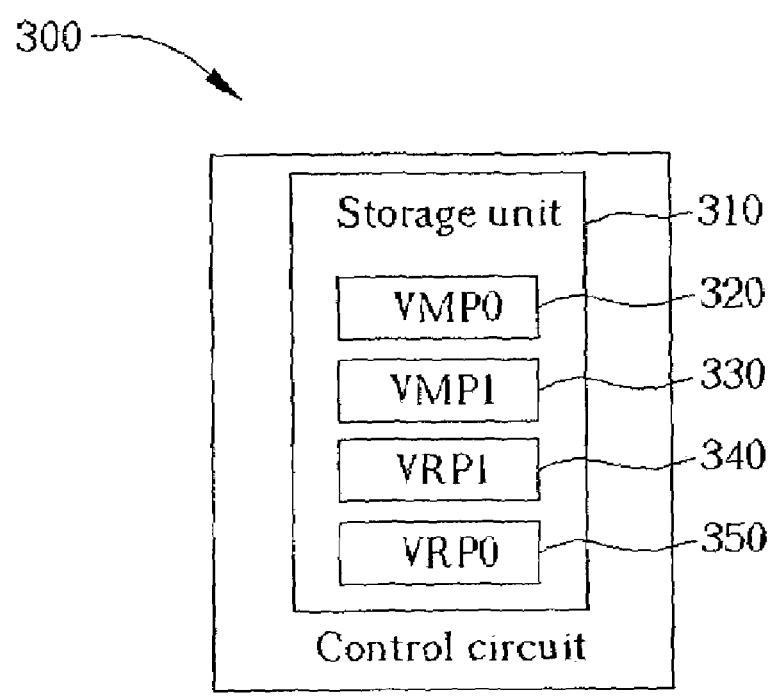
FIG. 4 is a block diagram of a control circuit according to the present invention.

Please refer to FIG. 2 through FIG. 4. FIG. 2 is a block diagram of an accumulation circuit 100 for calculating match values according to the present invention. FIG. 3 illustrates a circular data buffer 200 used in the present invention. FIG. 4 is a block diagram of a control circuit 300 for the present invention.

The accumulation circuit 100 comprises a plurality of absolute difference calculation circuits (ADCC) 110, a multiple input adder 150, a full adder 160, a multiplexer 180, a demultiplexer 170, and a plurality of accumulators 192, 194, 196, and 198. Each accumulator may be a register or in memory and of a size sufficient to insure an accurate total of the absolute differences between a reference block and a search location, which in turn depends upon the size of a reference block being used.

In a preferred embodiment of the present invention shown in FIG. 2, each ADCC 110 comprises a subtractor 115, a multiplexer 130, and diode inverter 120. The subtractor 115 has a first input and a second input for receiving data, a first output, a second output, and a third output for transmitting the result of the subtraction. The first output transmits a one's complement result, the second output transmits the normal output of subtractor, and the third output transmits a carry signal Cn according the result of the subtraction. The multiplexer 130 selects for output to the multiple input adder. If the Cn is equal to 0, i.e., the result of subtractor is a positive number, the normal output of subtractor is transmitted to the multiple adder. If the Cn is equal to 1, i.e., the result of subtractor is a negative number, the ones complement result is transmitted to the multiple input adder 150. All the Cn will be decoded by decode circuit 140. The decode circuit 140 is used to count the number of Cn is equal to one. The output of decode circuit 140 is transmitted to the multiple adder.

Regardless if the ADCC disclosed by the preferred embodiment is used or an ADCC of another type is used, the control circuit 300 then causes the multiplexer 180 to sequentially select one accumulator 192, 194, 196, 198. The value stored in the selected accumulator 192, 194, 196, 198 is added in the full adder 160 to the value output by the multiple input adder 150. The control circuit 300 then causes the demultiplexer 170 to route the output of the full adder 160 to the same selected accumulator 192, 194, 196, 198 so that the value in that same accumulator 192, 194, 196, 198 is incremented by the amount being output by the multiple input adder 150. The multiplexer 180 and the demultiplexer 170 are both controlled by signals from the control circuit 300. The signals comprise the least significant bits of the number of the first byte being currently transmitted from the circular SW buffer. In this example, bytes 0-3 are transmitted first, followed sequentially by bytes 1-4, bytes 2-5, and bytes 3-6. Thus a 2-bit signal can indicate which accumulator 192, 194, 196, 198 is to be active. The control circuit selects each accumulator 192, 194, 196, 198 in a round-robin fashion, with the accumulator 192, 194, 196, 198 selected rotating with each transfer of new data to the accumulation circuit 100, allowing four different search locations to be calculated in one pass of a reference block.

Data destined for the accumulation circuit 100 comprises pixel data included in the reference block (RB) and a search window (SW), the search window including at least one search location. The pixel data for both the reference block and the search window is usually stored in memory. Because accessing memory consumes more power than accessing a local buffer, the present invention comprises two circular buffers 200: a circular SW buffer 200S and a circular RB buffer 200R. Obviously, the term "circular" refers to the method of accessing the circular buffers 200S, 200R rather than to a physical arrangement. Methods of providing circular access to a buffer are know in the art. The circular buffers 200S, 200R shown in FIG. 3 each comprise 4 words with each word 4 bytes in length, but another size for either or both of the buffers 200S, 200R can easily be employed in another example of the present invention. The point is that using the buffers as disclosed in the present invention minimizes the number of memory accesses, and therefore reduces power consumption.

To control access to each circular buffer 200S, 200R, the control circuit 300 comprises a storage unit 310 for storing addresses of current locations within the circular buffers 200S, 200R. For this purpose, the storage unit 310 of the control circuit 300 comprises indices VWP0 320, VWP1 330, VRP0 340, and VRP1 350. The VWP0 320 is a word index and comprises the address of where in the circular buffer 200S a next word of SW data is to be loaded. The VWP1 330 is also a word index and comprises the address of where in the circular buffer 200R a next word of RB data is to be loaded. The VRP0 340 is a byte index and indicates the next byte of data in the circular buffer 200S to be sent to the accumulation circuit 100. The VRP1 350 is also a byte index and indicates the next byte of data in the circular buffer 200R to be sent to the accumulation circuit 100.

Figure 5:
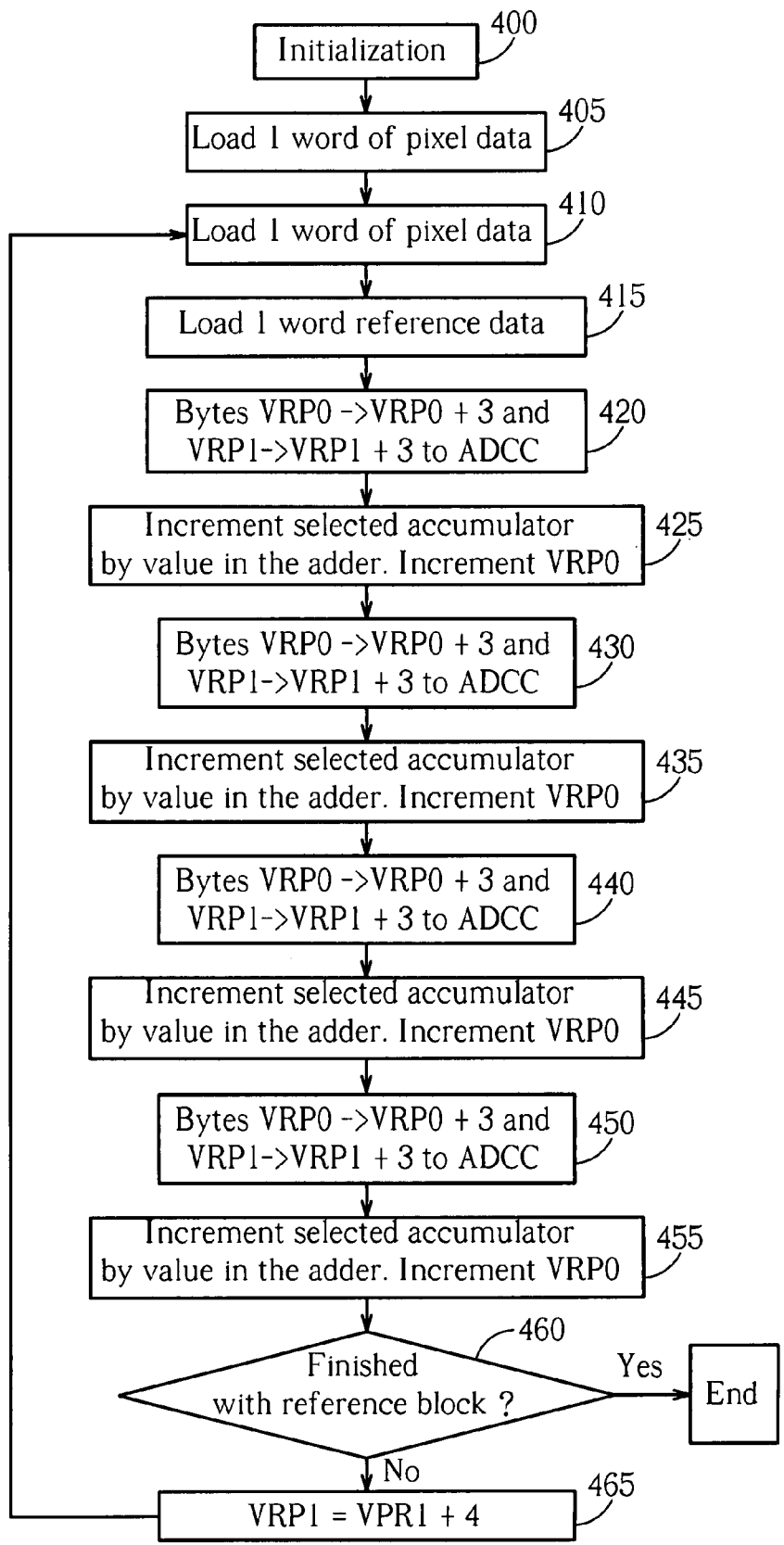
FIG. 5 is a flow chart of calculating match values according to the present invention.

The present invention can best be described by example. Please refer to FIG. 5. To simplify the explanation, each of the circular buffers 200S, 200R in this example comprises 4 words of address space with each word 4 bytes in length. The first byte in each of the circular buffers 200S, 200R has an address of 0, although obviously in reality a different address may be used. The indices VWP0, VWP1 increment by word and the indices VRP0, VRP1 increment by byte. When incremented beyond the address space of the applicable circular buffer 200S, 200R, all indices VWP0, VWP1, VRP0, and VRP1 wrap around so that the first byte in the circular buffer 200S, 200R sequentially follows the last byte in the circular buffer 200S, 200R. The present invention comprises the following steps in this example to calculate match values for four search locations. A 16 pixel by 16 pixel reference block and a 16 pixel by 19 pixel search window are used. In this example, it is assumed that the start addresses of the reference block and the search window are in word alignment. If the start addresses of reference block and search window are not in word alignment, the following steps can be modified with a suitable VRPn and VWPn.

Step 400: Initialization. All accumulators=0. VWP0=0. VRP0=0. VWP1=0. VRP1=0.

Step 405: Load 1 word of SW pixel data into the circular SW buffer at VWP0. Increment VWP0.

Step 410: Load 1 word of SW pixel data into the circular SW buffer at VWP0. Increment VWP0.

Step 415: Load 1 word of reference data into the circular RB buffer at VWP1. Increment VWP1.

Step 420: Send bytes VRP0 through VRP0+3 from the circular SW buffer and bytes VRP1 through VRP1+3 from the circular RB buffer to the absolute difference calculation circuits.

Step 425: Increment the value in a first selected accumulator by the value in the full adder. Increment VRP0.

Step 430: Send bytes VRP0 through VRP0+3 from the circular SW buffer and bytes VRP1 through VRP1+3 from the circular RB buffer to the absolute difference calculation circuits.

Step 435: Increment the value in a second accumulator by the value in the full adder. Increment VRP0.

Step 440: Send bytes VRP0 through VRP0+3 from the circular SW buffer and bytes VRP1 through VRP1+3 from the circular RB buffer to the absolute difference calculation circuits.

Step 445: Increment the value in a third accumulator by the value in the full adder. Increment VRP0.

Step 450: Send bytes VRP0 through VRP0+3 from the circular SW buffer and bytes VRP1 through VRP1+3 from the circular RB buffer to the absolute difference calculation circuits.

Step 455: Increment the value in a fourth accumulator by the value in the full adder. Increment VRP0.

Step 460: Finished with reference block? Yes→end.

Step 465: VRP1=VPR1+4. Go to step 410.

The search locations in the above example are offset from one another by one pixel and overlap to a great degree. Another example of the present invention is extended to function using different offsets or locations by having the control circuit 300 select different accumulators 192, 194, 196,198, not in a round-robin sequence, but according to a look-up table (or a programmable decoder circuit). The look-up table indicates which comparisons of bytes from the reference block and bytes from the search window belong to a specific search location and the accumulator 192, 194, 196, 198 representing that specific location is then selected by the control circuit 300 for updating. Additionally, the number of absolute difference calculation circuits 110 and corresponding number of accumulators 192, 194, 196, 198 may be altered to suit design purposes. For example, another embodiment of the present invention uses 8 absolute difference calculation circuits 110 and 8 accumulators 192, 194, 196, 198 and merely adjusts the indices 320, 330, 340, 350 accordingly. However, the embodiment disclosed in FIG. 5 comprising 4 absolute difference calculation circuits 110 and 4 accumulators 192, 194, 196, 198 works well with little overhead for small screened devices such as a PDA or a cellular phone.

By comparing the same group of reference block bytes sequentially with the corresponding data from each search location before loading new reference data, the match values from four search locations can be calculated at the same time. Each byte of data, whether from the reference block or the search window, needs to be fetched from memory and stored in the corresponding buffer only one time for each four search locations. This present invention feature is in stark contrast with the prior art where the reference block must be reloaded into memory once for each search location and pixels in overlapping search locations may be loaded several times. Therefore, by reducing the number of memory accesses, the present invention reduces the power consumed and system load when calculating absolute difference values during image correlation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital signal processor comprising:
   a first buffer for storing data from a reference block;
   a second buffer for storing data from a search window;
   a plurality of absolute difference calculation circuits for calculating the absolute difference between the reference block data and the search window data;
   a multiple input adder for summing outputs from the absolute difference calculation circuits;
   a plurality of accumulators, each accumulator corresponding to a different search location within the search window and for accumulating the sums of absolute differences corresponding to that search location;
   a full adder for adding the sums of the absolute differences corresponding to one of the search locations to a value held in the accumulator corresponding to that same search location;
   a control circuit for determining which portions of data in the first buffer and in the second buffer are transmitted to the absolute difference calculation circuits and for determining to which accumulator the transmitted data corresponds;
   a multiplexer controlled by the control circuit to select one of the plurality of accumulators so that the value held in the selected accumulator is input to the full adder; and
   a demultiplexer controlled by the control circuit so that after the value held in the selected accumulator is input to the full adder, an output of the full adder is stored in the selected accumulator.

2. The digital signal processor of claim 1 wherein the control circuit determines which portions of data in the first buffer are transmitted to the absolute difference calculation circuits such that each portion of reference block data is loaded from memory into the first buffer only one time when calculating match values for a plurality of search locations equal to the plurality of accumulations.

3. The digital signal processor of claim 1 wherein the first buffer and the second buffer are registers.

4. The digital signal processor of claim 1 wherein the plurality of absolute difference calculation circuits is equal to four.

5. The digital signal processor of claim 4 wherein the plurality of accumulators is equal to four.

6. The digital signal processor of claim 1 wherein the control circuit rotates selection of the plurality of accumulators on a round-robin basis, a different accumulator being selected each time different data is transmitted from the second buffer to the absolute difference calculation circuits.

7. The digital signal processor of claim 6 wherein each absolute difference calculation circuit comprises a subtractor, a multiplexer, and diode inverter.

8. The digital signal processor of claim 7 wherein each subtractor outputs a carry signal to a decoder, the decoder summing the carry signals from the plurality of subtractors and outputting the sum of the carry signals to one input of the multiple input adder.

9. A digital signal processor for calculating image correlational values between a reference block and a plurality of search locations within a search window, the digital signal processor comprising:
a first buffer for storing data from the reference block;
a second buffer for storing data from the search window;
a plurality of absolute difference calculation circuits for calculating the absolute difference between a plurality of bytes of data from the first buffer and an equal plurality of bytes of data from the second buffer, the differences being summed by a multiple input adder and output as a first result;
a plurality of accumulators, each accumulator for uniquely accumulating first results corresponding to a specific search location;
a control circuit for determining which bytes of the first buffer and which bytes of the second buffer are transmitted to the absolute difference calculation circuits;
a full adder with one input connected to an output of the multiple input adder for receiving the first result;
a demultiplexer for determining which accumulator is to accumulate the first result, the demultiplexer selecting one of the accumulators according to a signal from the control circuit; and
a multiplexer for allowing transmission of a value in the selected accumulator to another input of the full adder;
wherein when the control circuit transmits each first set of bytes from the first buffer to the absolute difference calculation circuits, a plurality of second sets of bytes from the second buffer, each second set of bytes uniquely corresponding to one of the plurality of search location, are sequentially transmitted to the absolute difference calculation circuits such that the first result generated by each second set of bytes is accumulated in the accumulator corresponding to that search location.

10. The digital signal processor of claim 9 wherein the multiplexer selects one of the accumulators according to a signal from the control circuit, the signal comprising the least significant bits of a byte number transmitted by the control circuit from the second buffer to the absolute difference calculation circuits.

11. The digital signal processor of claim 9 wherein each absolute difference calculation circuit comprises a subtractor, a multiplexer, and diode inverter.

12. A method to reduce system load during motion estimation in a digital signal processor by calculating absolute differences between a reference block and a plurality of search locations within a search window at the same time, the digital signal processor comprising a first buffer and a second buffer for storing pixel data, a plurality of absolute difference calculation circuits, a multiple input adder, a full adder, a plurality of accumulators, and a control circuit, the control circuit having a storage unit comprising indices indicating an address in the first or second buffer, the method comprising:
initializing all accumulators and indices;
loading data from a reference block into the first buffer;
loading data from the search window in memory into the second buffer;
transmitting a first set of data in the first buffer and a second set of data in the second buffer to the absolute difference calculation circuits;
incrementing the value in a first selected accumulator by the absolute differences between the first set of data in the first buffer and the second set of data in the second buffer;
transmitting the same first set of data in the first buffer and a different second set of data in the second buffer to the absolute difference calculation circuits; and
incrementing the value in a second selected accumulator by the absolute differences between the first set of data in the first buffer and the different second set of data in the second buffer;
wherein when the first set of data and the second set of data are transmitted to the absolute difference calculation circuits, the resulting calculated absolute differences are summed by the multiple input adder and the sum output to one input of the full adder, the control circuit signals a multiplexer to allow a value held in the first selected accumulator to be transmitted to another input of the full adder where the value is added to the sum at the first input of the full adder, and the control circuit signals a demultiplexer to allow the output of the full adder to be stored in the first selected accumulator.

13. The method of claim 12 further comprising transmitting the same first set of data in the first buffer and a third second set of data in the second buffer to the absolute difference calculation circuits and incrementing the value in a third selected accumulator by the absolute differences between the first set of data in the first buffer and the third second set of data in the second buffer.

14. The method of claim 12 wherein each byte of data in the reference block is loaded from memory into the first buffer only one time during the calculations of the absolute differences between the reference block and the plurality of search locations.

* * * * *